US012691970B2

(12) United States Patent
　　Braun et al.

(10) Patent No.: US 12,691,970 B2
(45) Date of Patent: Jul. 28, 2026

(54) DRIVE ASSEMBLY

(71) Applicant: Robert Bosch GmbH, Stuttgart (DE)

(72) Inventors: Sigmund Braun, Kusterdingen (DE);
　　　　　Adolf Dillmann, Muensingen (DE);
　　　　　Alexander Elter, Oftersheim (DE);
　　　　　Daniel Hettinger,
　　　　　Reutlingen-Bronnweiler (DE); Harald
　　　　　Hundt, Aichelberg (DE); Julian
　　　　　Binder, Wannweil (DE); Stefan Holst,
　　　　　Reutlingen (DE)

(73) Assignee: ROBERT BOSCH GMBH, Stuttgart
　　　　　(DE)

( * ) Notice: Subject to any disclaimer, the term of this
　　　　　patent is extended or adjusted under 35
　　　　　U.S.C. 154(b) by 578 days.

(21) Appl. No.: 18/168,242

(22) Filed: Feb. 13, 2023

(65) Prior Publication Data

US 2023/0278661 A1　　Sep. 7, 2023

(30) Foreign Application Priority Data

Mar. 1, 2022　(DE) ..................... 10 2022 202 101.0

(51) Int. Cl.
　　*B62M 6/55*　　　(2010.01)
　　*B62K 25/04*　　　(2006.01)
(52) U.S. Cl.
　　CPC .............. *B62M 6/55* (2013.01); *B62K 25/04*
　　　　　　　　　　　　　　　(2013.01)
(58) Field of Classification Search
　　CPC . B62M 6/55; B62M 6/40; B62M 6/80; B62K
　　　　　　19/34; B62K 25/04; B62K 19/30; B62K
　　　　　　　　　　　　2204/00; F03G 5/064

USPC ................................................... 180/220, 227
See application file for complete search history.

(56) References Cited

U.S. PATENT DOCUMENTS

| | | | | |
|---|---|---|---|---|
| 2023/0322327 | A1* | 10/2023 | Greven | .................... B62M 6/55 |
| | | | | 180/206.4 |
| 2023/0415849 | A1* | 12/2023 | Hemsing | ................ B62K 19/34 |

FOREIGN PATENT DOCUMENTS

| | | | | |
|---|---|---|---|---|
| DE | 102020200385 A1 | 7/2021 | | |
| DE | 102020210864 A1 | 3/2022 | | |
| DE | 102020214830 A1 | 5/2022 | | |
| DE | 102023114110 A1 * | 12/2024 | .............. | B62M 6/55 |
| EP | 3686102 B1 * | 10/2021 | .............. | B62M 6/40 |
| WO | 2022049055 A1 | 3/2022 | | |

* cited by examiner

*Primary Examiner* — John Olszewski
*Assistant Examiner* — Matthew D Lee
(74) *Attorney, Agent, or Firm* — NORTON ROSE
FULBRIGHT US LLP

(57) ABSTRACT

A drive assembly of a vehicle operable with muscular power
and/or motor power. The drive assembly including a drive
unit, a frame interface, wherein the drive unit is arranged at
least partially between a first wall and a second wall of the
frame interface, a first bracket holding the drive unit on the
first wall, and a second bracket holding the drive unit on the
second wall. The first bracket comprises a first damping
sleeve inserted into a first opening of the drive unit, the
second bracket comprises a second damping sleeve inserted
into a second opening of the drive unit, wherein each
damping sleeve is screwed to the corresponding wall by
means of a screw. Each damping sleeve comprises a sleeve,
and a damping element which at least partially surrounds the
sleeve and is formed from a vibration-damping material.

21 Claims, 13 Drawing Sheets

DRIVE ASSEMBLY

CROSS REFERENCE

The present application claims the benefit under 35 U.S.C. § 119 of German Patent Application No. DE 10 2022 202 101.0 filed on Mar. 1, 2022, which is expressly incorporated herein by reference in its entirety.

FIELD

The present invention relates to a drive assembly and to a vehicle comprising the drive assembly.

BACKGROUND INFORMATION

Drive assemblies with drive units held between two walls of a frame interface are conventional. The drive unit is screwed to the two opposing walls. In doing so, a gap between the drive unit and one of the walls usually needs to be bridged. In order to make this possible, a retaining plate may, for example, be provided on the drive unit, which retaining plate is elastically deformed to bridge the gap. However, this may adversely affect the mechanical loading and tightness of the drive assembly.

SUMMARY

In a drive assembly according to the present invention, in terms of loading, an advantageous mounting of a drive unit within a frame interface is enabled in a simple manner. In addition, vibration decoupling between the drive unit and the frame interface is enabled, which furthermore has an advantageous effect on reliable and secure fastening and on high user comfort. According to an example embodiment of the present invention, this may be achieved by a drive assembly of a vehicle operable with muscular power and/or motor power, in particular of an electric bicycle, comprising a drive unit and a frame interface, wherein the drive unit is arranged at least partially between a first wall and a second wall of the frame interface. A first bracket holds the drive unit on the first wall, and a second bracket holds the drive unit on the second wall. The first bracket comprises a first damping sleeve inserted, preferably pressed, into a first opening of the drive unit. The second bracket comprises a second damping sleeve inserted, preferably pressed, into a second opening of the drive unit. Each damping sleeve is screwed to the corresponding wall of the frame interface by means of a screw. Each damping sleeve comprises a sleeve and a damping element. The damping element is formed from a vibration-damping material and surrounds the sleeve at least partially, preferably completely in the circumferential direction.

In other words, according to an example embodiment of the present invention, a drive assembly is provided in which the drive unit is fastened to walls of the frame interface by means of the brackets. A respective damping sleeve, which is in particular designed in two parts, is provided per bracket. Preferably, all damping sleeves of the drive assembly are identical. The sleeve of each damping sleeve is preferably cylindrical and in particular has an internal thread into which the screw is screwed. Preferably, the sleeve is formed from metal. This sleeve is at least partially surrounded by the damping element. The damping element is thus located between the sleeve and the drive unit. In particular, the damping element is formed from an elastically deformable material. By forming the damping element from a vibration-damping material, vibration transmission between the walls of the frame interface and the drive unit is reduced or suppressed.

According to an example embodiment of the present invention, preferably, the drive assembly comprises several first brackets and several second brackets, wherein all first brackets are identical, and wherein all second brackets are identical. In other words, a respective damping sleeve is provided on each bracket and is used to hold the drive unit on the frame interface.

The drive assembly may thus offer the advantage of optimized fastening of the drive unit to the frame interface in terms of vibration mechanics. This has a particularly advantageous effect on a durability of the screw connections since the vibration-damping screw connection reduces a transmission of oscillations and vibrations as well as changing dynamic loads due to the resilient and damping properties of the damping element. A changing mechanical load of the screw connection is thus also reduced or prevented, whereby a high durability of the screw connection can be provided. Moreover, occurrence of unwanted noises can thereby be reduced, for example. Furthermore, the damping element allows for some tolerance compensation due to elasticity, thereby enabling particularly simple and cost-effective production as well as assembly of the drive assembly.

Preferred developments of the present invention are disclosed herein.

According to an example embodiment of the present invention, preferably, the damping element is formed from an elastomer. As a result, the vibration-damping effect can be provided in a particularly simple and cost-effective manner. Moreover, there is the advantage of additional protection against corrosion, in particular galvanic corrosion, for example when the drive unit comprises a housing made of magnesium, wherein the walls of the frame interface are formed from aluminum, for example. Moreover, an axial and radial seal effect can be provided on the drive unit.

According to an example embodiment of the present invention, particularly preferably, the first bracket is designed in such a way that, in a screwed state, the first damping sleeve bridges a gap between the drive unit and the first wall. Preferably, the drive unit abuts against the second wall. In particular, the first damping sleeve is partially pulled out of the first opening of the drive unit. As a result, tolerance compensation between the frame interface and the drive unit can thus take place in a particularly simple manner. Advantageously, a desired load state of the drive unit can be provided, for example in the form of a neutral load or a minor tensile load.

According to an example embodiment of the present invention, preferably, the two openings of the drive unit are designed in such a way that a press fit between the first damping sleeve and the first opening has a smaller interference than a press fit between the second damping sleeve and the second opening. In other words, the press fit is weaker at the first opening than at the second opening. This achieves that when the drive assembly is assembled, i.e., when the two brackets are screwed, the first damping sleeve is selectively partially pulled out of the first opening in order to bring about the tolerance compensation, wherein the second damping sleeve is in particular not pulled out of the second opening. Preferably, for this purpose, the second opening has a smaller inner diameter than the first opening.

According to an example embodiment of the present invention, preferably, the drive unit comprises, per opening, a respective protruding mounting tab, within which the respective opening is arranged. In particular, the mounting tabs are designed as protruding flanges. This can provide a simple and cost-effective structure of the drive assembly at low weight.

According to an example embodiment of the present invention, preferably, the drive unit comprises a through-opening. Face ends of the through-opening form the first opening and the second opening, into which the first damping sleeve and the second damping sleeve, respectively, are inserted. This can enable a particularly simple and cost-effective production of the drive assembly, in particular since mechanical processing, for example, machining, of the drive unit can be enabled from only one direction, i.e., from an axial end of the through-opening. Moreover, coaxiality of the two openings can be ensured in a simple manner.

According to an example embodiment of the present invention, particularly preferably, the through-opening comprises a tapering region, which is arranged at the second opening. In particular, the tapering region is arranged on the axial or face end of the through-opening facing the second wall. The tapering region has a smaller inner diameter than the rest of the through-opening, in particular in the region of the first opening. This can particularly simply and reliably ensure that the press fit at the second damping element is stronger than the press fit at the first damping element.

In particular, the tapering region has a lower axial length than the second damping sleeve, in particular the part of the second damping sleeve arranged within the second opening in the fully inserted state. As a result, by elastically widening the part of the damping element located within the tapering region in the through-opening, a form fit is produced in the axial direction of the through-opening, which can particularly reliably prevent the second damping sleeve from being pulled out of the second opening during assembly of the drive assembly, but rather in particular the first damping sleeve.

According to an example embodiment of the present invention, preferably, the drive unit comprises a two-part housing having a base region and a lid. In particular, the housing and lid are joined together in a separation plane arranged between the two walls of the frame interface. The tapering region is in this case arranged exclusively within the lid. As a result, a particularly simple and cost-effective production of the drive unit can be enabled, in particular by improved accessibility of the housing parts, for example for mechanical processing.

According to an example embodiment of the present invention, further preferably, the second opening comprises a groove region comprising at least one groove extending circumferentially around an inner circumference of the second opening. As a result, by elastically widening the damping element into the at least one groove, a form fit can be provided in the axial direction of the through-opening. This ensures in a simple manner that the second damping element reliably holds in the axial direction of the second opening so that when the drive assembly is screwed, only the first damping element is partially pulled out of the first opening and produces the tolerance compensation.

According to an example embodiment of the present invention, preferably, each damping element comprises several circumferentially extending elevations on an outer circumference. Preferably, the elevations having a trapezoidal cross-section are formed in a radial cutting plane, wherein in particular the elevations protrude from a cylindrical lateral surface of the damping element. As a result, improved deformability of the damping element can be provided in a simple manner. Moreover, it may be provided that the grooves of the groove region and the elevations have a coordinated geometry. As a result, a precisely fitting engagement of elevations and grooves can be provided.

According to an example embodiment of the present invention, preferably, at least one of the two sleeves comprises a shank and a flange. In particular, the shank is inserted into the corresponding opening of the drive unit. The flange comprises a plurality of protruding form fit elements on a side facing the corresponding wall. The form fit elements are designed to be pressed into the wall as a result of the sleeve being screwed to the corresponding wall. By pressing into the wall, the form fit elements in particular cause plastic deformation of the wall, in particular in such a way that the form fit elements and the plastically deformed region of the wall form a form fit in a plane perpendicular to the screw axis. That is to say, on the surface of the flange, the sleeve comprises the protruding form fit elements that, when the sleeve and wall are screwed together, partially dig into the wall, in particular in order to produce, in the plane of the wall surface, a micro form fit in addition to the force closure resulting from the screw connection. As a result, a particularly firm connection of the drive unit to the frame interface can be provided since slippage between the sleeve and the wall can be prevented.

It is particularly advantageous if the flange of the sleeves can be provided with different thicknesses, in particular with regard to the axial direction of the sleeve. For example, the flange of a sleeve of a first embodiment may have a first thickness, wherein the flange of a sleeve of a second embodiment may have a second thickness that is a multiple, preferably at least 1.5 times, preferably at least twice, in particular at least three times, the first thickness. This results in the advantage that the width of the drive assembly, preferably measured along an axial direction of the through-hole, is variable in a particularly simple and cost-effective manner. For example, the width of the drive assembly can be adapted to a frame interface of different width by varying the thickness of the flanges of the sleeves, so that the drive assembly can be used particularly flexibly and cost-effectively.

According to an example embodiment of the present invention, preferably, each form fit element comprises a pyramid protruding from a surface of the flange of the sleeve. Alternatively, each form fit element comprises a cone protruding from a surface of the flange of the sleeve, for example. In other words, a plurality of pyramid tips protruding from the surface of the flange are provided as form fit elements. Particularly preferably, the pyramids are pointed and in particular have an opening angle of less than 60°, preferably less than 45°, so that they can particularly easily penetrate into the wall. Such a design with pointed pyramids as form fit elements is particularly advantageous for the screw connection of the drive unit to carbon frames, i.e., to frame interfaces that consist at least partially of a fiber-reinforced, preferably carbon fiber-reinforced, plastic. This results in the advantage that the pointed pyramids can press into the mesh structure of the carbon without damaging the latter. In particular, when the pyramids penetrate, the fibers are not broken but can yield and lie around the respective pyramid.

Further preferably, according to an example embodiment of the present invention, in the surface of the flange, each form fit element comprises a recess adjacent to the pyramid, for example, surrounding the pyramid. Preferably, the recess is designed as an annular groove. Particularly preferably, a single recess is formed in the surface of the flange, the pyramids being arranged on the radial inner side and/or outer side of said recess. Alternatively, a separate recess can be formed per pyramid, wherein the recess is in particular arranged immediately adjacent to the pyramid. The recess can, for example, receive the material of the wall displaced by the penetration of the pyramid into the wall, in order to enable a reliable and defined abutment of the surface of the flange against the wall.

Preferably, according to an example embodiment of the present invention, at least one of the sleeves comprises a shank and a flange. In particular, the shank is inserted into the corresponding opening of the drive unit. The flange is preferably disk-shaped. The flange has a taper at a radially outer end. The taper is arranged on the side of the flange facing the shank. A reduction of the thickness of the flange, in particular in the axial direction of the sleeve, is in particular considered to be a taper. In particular, the taper corresponds to a difference of the maximum thickness and the minimum thickness of the flange, wherein this difference preferably corresponds to at least 50%, preferably at most 150%, of a wall thickness of the shank of the sleeve. The taper of the flange is in this case compensated by the damping element. In other words, a thickness of the damping element in the region of the taper is greater than in the remaining region of the flange. Preferably, an overall thickness of the damping sleeve is constant in the axial direction in the region of the flange. Alternatively, the damping element may preferably have a stripping on a radially outer end of the side facing the shank. By the taper of the flange and the thicker damping element in this region, a softer zone of the damping sleeve can be provided in this region and allows a particularly good seal effect between the damping sleeve and the drive unit.

Further preferably, according to an example embodiment of the present invention, the drive unit comprises at least one protruding annular rib, which is arranged concentrically with one of the two openings. Preferably, the annular rib has a conical or trapezoidal cross-section. Particularly preferably, the protruding annular rib and the taper of the flange of the sleeve are arranged on the same radius with respect to an opening axis of the opening of the drive unit. In other words, the protruding annular rib and the taper of the flange of the sleeve are arranged at the same height relative to the radial direction of the opening of the drive unit. The protruding annular rib can thus optimally dip into the thicker region of the damping element during the assembly of the drive assembly, whereby a particularly good seal effect can be provided between the damping sleeve and the drive unit.

Preferably, according to an example embodiment of the present invention, the drive assembly furthermore comprises a friction coating arranged on a surface of the drive unit and/or on a surface of the frame interface and/or on a surface of the first damping sleeve and/or on a surface of the second damping sleeve. The friction coating comprises hard particles in order to increase friction in the region of the friction coating. In other words, the friction coating is formed in a contact region of two of the components on at least one of these contacting components. The hard particles are clamped between the adjacent components as a result of the screw connection and are in particular pressed into these parts by the screw force in order to produce a micro form fit in a plane of the contact surface. Preferably, the hard particles are formed from diamond. By means of the friction coating, a coefficient of friction can thus be increased in the intermediate layer between two adjacent components in order to enable a particularly robust and reliable fastening of the two components.

According to an example embodiment of the present invention, particularly preferably, the friction coating furthermore comprises a nickel layer, with which the hard particles are in particular coated. As a result, the hard particles adhere to the component to be coated.

According to an example embodiment of the present invention, preferably, the friction coating furthermore comprises a lacquer with which the hard particles are coated, in particular in the unscrewed state. In particular, the lacquer is a powder lacquer. In particular, the friction coating is produced in such a way that the hard particles, which are in particular coated with the nickel layer, are first applied to a sub-region of the surface of the component to be coated, for example by spraying. The entire surface of the component is subsequently preferably coated with the lacquer. When the component is screwed to a further component as a counterpart, the hard particles can dig into one or both components in order to produce the micro form fit. In the process, the lacquer is compressed or smoothed by the component surfaces pressed against one another by means of the screw connection, resulting in a supplementary seal effect between the two components. In edge zones of the joint, the lacquer is also displaced outward, thereby producing a further seal effect. As a result of the friction coating, a particularly advantageous connection of the two components can thus be provided by means of screwing.

Further preferably, according to an example embodiment of the present invention, the flange of at least one sleeve has a predetermined thickness, in particular in the direction parallel to a longitudinal direction of the sleeve, which is substantially equal to a wall thickness of the shank, in particular in the radial direction. Alternatively, the flange of at least one sleeve preferably has a predetermined thickness, in particular in the direction parallel to a longitudinal direction of the sleeve, which is at least 1.5 times a wall thickness of the shank, in particular in the radial direction. A variable width of the drive assembly can thus be provided, which allows an adaptation to a frame interface of different width in a particularly simple and cost-effective manner.

According to an example embodiment of the present invention, preferably, the drive unit comprises a motor and/or a transmission. The particular arrangement and mounting between the walls of the frame interface can provide an optimal reliable connection with advantageous mechanical force distribution in order to enable a long service life of the drive unit.

Furthermore, the preset invention results in a vehicle, preferably a vehicle operable with muscular power and/or motor power, preferably an electric bicycle comprising the described drive assembly. For example, the frame interface may be part of a vehicle frame of the vehicle.

According to an example embodiment of the present invention, preferably, the vehicle comprises a vehicle frame. The frame interface of the drive assembly is an integral part of the vehicle frame, i.e., the vehicle frame is designed with the frame interface as a one-piece component, wherein the drive unit is preferably directly connected to the frame interface, i.e., in particular without additional intermediate components. Alternatively, the frame interface of the drive assembly and/or one or both of the walls of the frame interface is preferably designed as a separate component from the vehicle frame and connected, preferably screwed, to the vehicle frame. The drive unit can thus be indirectly fastened to the frame interface, for example.

According to an example embodiment of the present invention, particularly preferably, the vehicle furthermore comprises a chainring connected to an output shaft of the drive unit. The second bracket of the drive assembly is arranged on the side of the chainring. In particular if the second bracket is designed as a fixed bearing and the first bracket is designed as a floating bearing, for example by the tolerance compensation only taking place by partially pulling out the first damping sleeve, an optimal direct force transmission between the drive unit and the chainring can take place as a result. Moreover, precise positioning of the chainring is ensured, resulting in an optimal arrangement of a chainline.

BRIEF DESCRIPTION OF THE DRAWINGS

The present invention is described below based on exemplary embodiments in connection with the figures. In the figures, functionally identical components are respectively denoted by identical reference signs.

DETAILED DESCRIPTION OF EXAMPLE EMBODIMENTS

Figure 1:
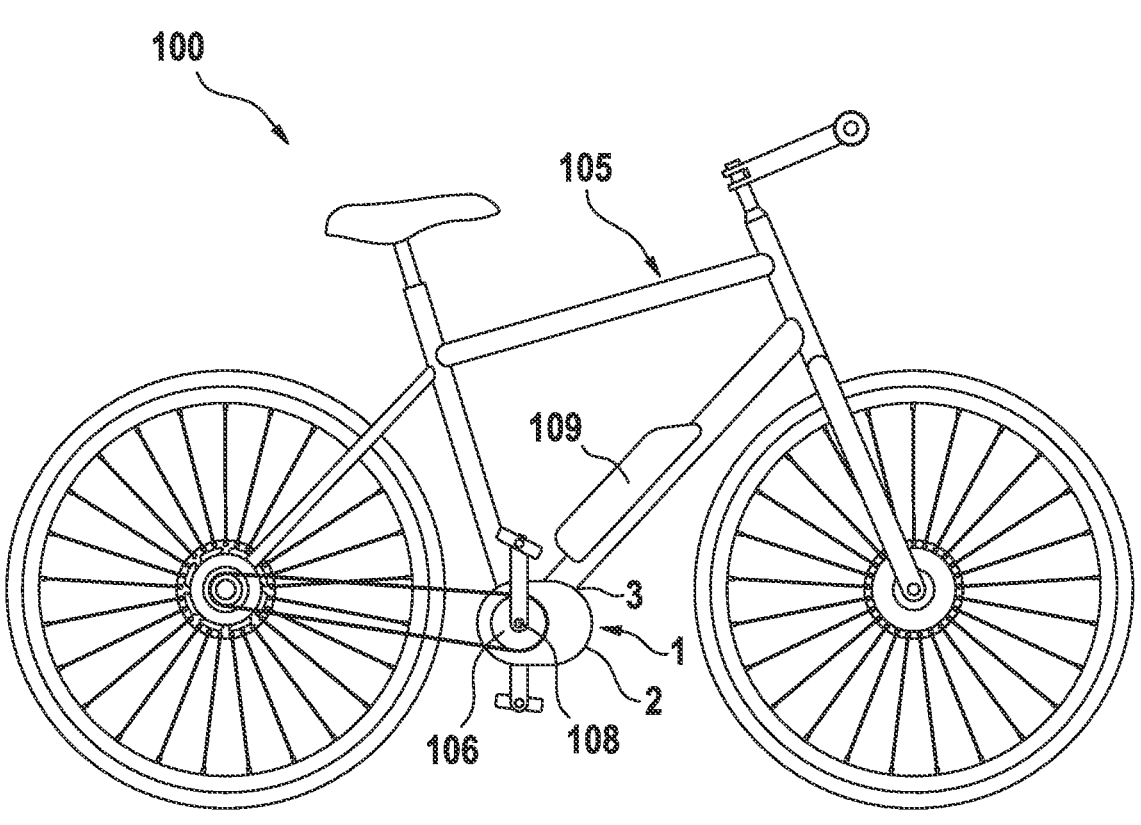
FIG. 1 shows a simplified schematic view of a vehicle having a drive assembly according to a first exemplary embodiment of the present invention.

FIG. 1 shows a simplified schematic view of a vehicle 100 operable with muscular power and/or motor power and comprising a drive assembly 1 according to a first exemplary embodiment of the present invention. The vehicle 100 is an electric bicycle. The drive assembly 1 is arranged in the region of a bottom bracket and comprises a drive unit 2. The drive unit 2 comprises an electric motor and a transmission and is provided to provide a motor assist to the rider's pedal force generated by muscular power, by means of a torque generated by the electric motor. The drive unit 2 is supplied with electrical power by an electrical energy store 109 of the vehicle 100.

Figure 2:
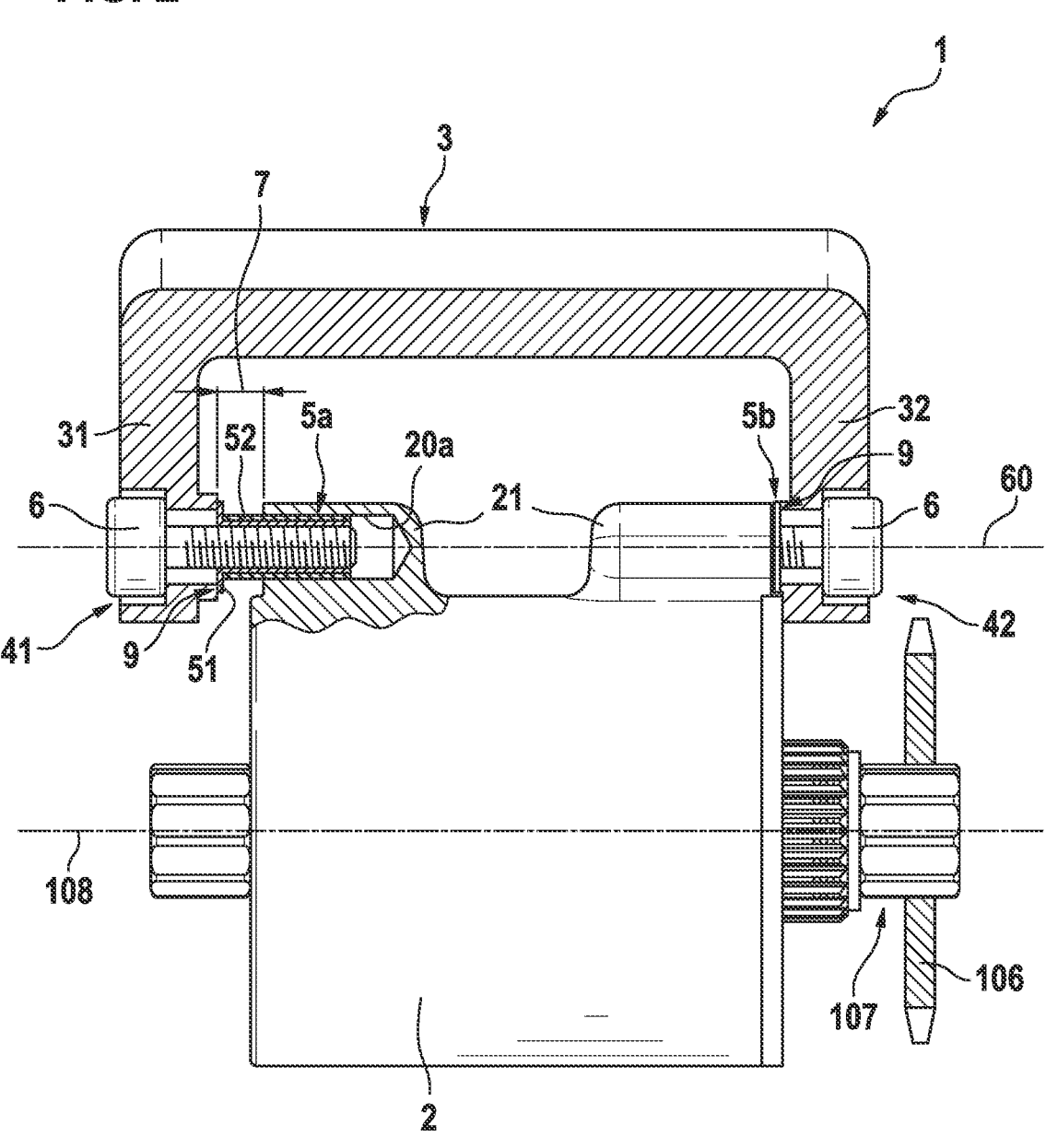
FIG. 2 shows a sectional view of the drive assembly of FIG. 1 in the fully screwed state.
Figure 3:
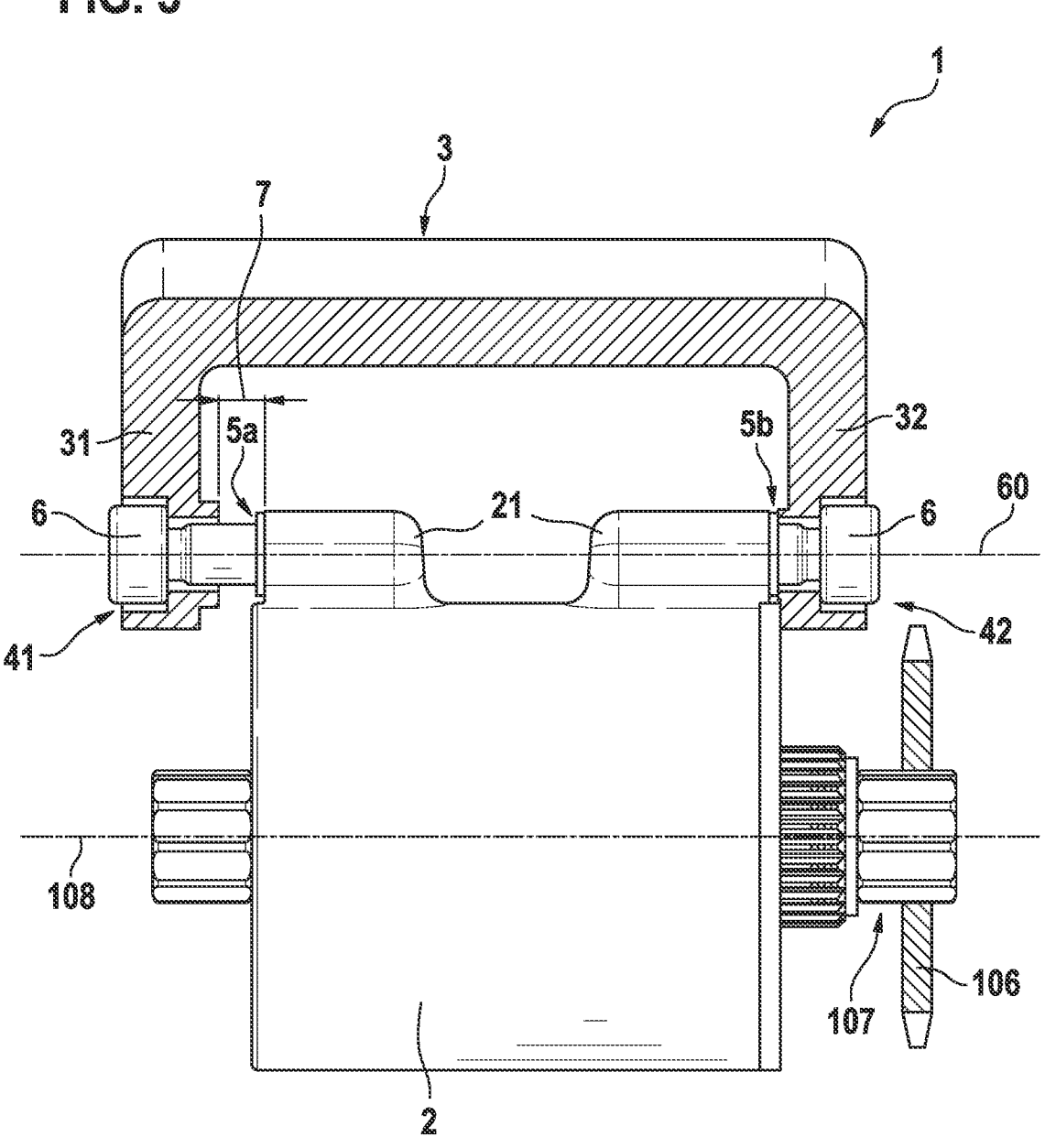
FIG. 3 shows a sectional view of the drive assembly of FIG. 1 in a partially screwed state.

The drive assembly 1 of the first exemplary embodiment is shown in sectional views in FIGS. 2 and 3.

The drive assembly 1 furthermore comprises a U-shaped frame interface 3 within which the drive unit 2 is partially received. The frame interface 3 is an integral part of a vehicle frame 105 of the vehicle 100 (cf. FIG. 1). The frame interface 3 comprises a first wall 31 and a second wall 32, between which a part of the drive unit 2 is arranged.

The drive unit 2 is screwed to each of the two walls 31, 32. Specifically, a first bracket 41 holding the drive unit 2 on the first wall 31 is provided. A second bracket 42 holding the drive unit 2 on the second wall 32 is also provided. Each of the two brackets 41, 42 comprises a respective screw 6, which is screwed from outside the frame interface 3 through the corresponding wall 31, 32 into a damping sleeve 5a, 5b. The damping sleeves 5a, 5b are pressed into a respective opening 20a, 20b of the drive unit 2.

The openings 20a, 20b of the drive unit 2 are each designed as blind holes in protruding tabs 21 of the drive unit 2. The two openings 20a, 20b are arranged coaxially, i.e., on a common opening axis 60.

The two damping sleeves 5a, 5b of the first bracket 41 and the second bracket 42, respectively, are identical. Each damping sleeve 5a, 5b comprises a sleeve 51, which is designed as a cylindrical metal sleeve with an internal thread and a flange. In addition, each damping sleeve 5a, 5b comprises a damping element 52, which circumferentially completely surrounds the cylindrical region of the sleeve 51. The damping element 52 is formed from a vibration-damping material, specifically an elastomer. In particular, the damping element 52 is designed as an overmolding of the sleeve 51.

Connecting the drive unit 2 and the frame interface 3 via the damping sleeves 5a, 5b results in the advantage of a vibration-decoupled mounting of the drive unit 2 to the vehicle 100. In addition to preventing or reducing a transmission of acoustic vibrations, which has an advantageously effect on noise reduction during operation of the vehicle 100, a transmission of mechanical vibrations is also reduced or prevented. A damaging effect of such vibrations on the screw connections on the brackets 41, 42 can thus be prevented or reduced. That is to say, loosening or unscrewing the screw connections can be prevented or reduced. Moreover, as a result of the elasticity of the damping element 52 itself, some tolerance compensation can take place, for example with respect to a coaxiality of the bores or openings, or the like.

Figure 11:
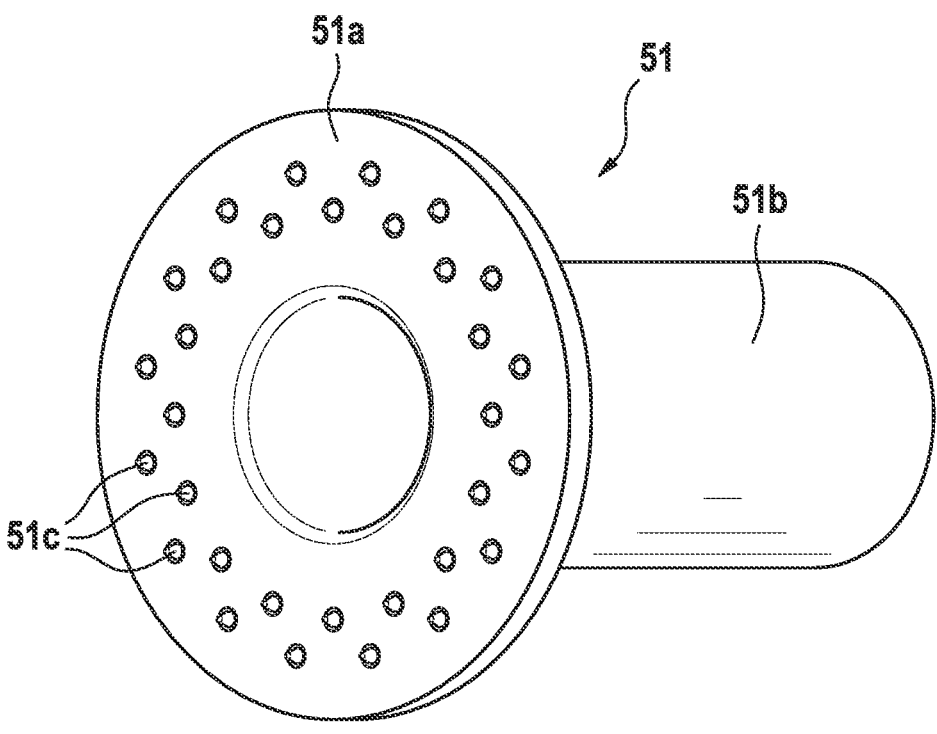
FIG. 11 shows a detail of a drive assembly according to a fifth exemplary embodiment of the present invention.

When assembling the drive assembly 1, all damping sleeves 5a, 5b are first pressed completely into the corresponding openings 20a, 20b, in particular until the flange 51a of the sleeve 51 abuts against the drive unit 2 (cf. FIG. 3 and FIG. 11). The drive unit 2 is subsequently placed between the walls 31, 32 of the frame interface 3.

First, the screw 6 of the second bracket 42 is preferably screwed into the second damping sleeve 5b so that the drive unit 2 abuts against an inner side of the second wall 32. The screw 6 of the first bracket 41 is subsequently screwed into the first damping sleeve 5a. The screw 6 of the first bracket 41 is screwed in such a way that the first damping sleeve 5a is partially pulled out of the first opening 20a of the drive unit 2 until the first damping sleeve 5a, specifically the flange 51a of the sleeve 51, abuts against the inner side of the first wall 31 (cf. FIG. 2). As a result, a gap 7 between the drive unit 2 and the first wall 31 is bridged by means of the first damping sleeve 5a. The first damping sleeve 5a thus causes tolerance compensation between the frame interface 3 and the drive unit 2.

In order to achieve the tolerance compensation, i.e., the bridging of the gap 7, selectively on the side of the first wall 31, the two openings 20a, 20b are designed differently. Specifically, the two openings 20a, 20b are designed in such a way that a press fit between the first damping sleeve 5a and the first opening 20a has a smaller interference and is thus weaker than a press fit between the second damping sleeve 5a and the second opening 20b. As a result, during the screwing process, only the first damping sleeve 5a is selectively pulled out of the first opening 20a.

Preferably, the stronger press fit at the second opening 20b is caused by the second opening 20b having a slightly smaller diameter than the first opening 20a.

As a result of the selective tolerance compensation on the side of the first wall 31, an advantageous positioning of the drive unit 2 in the frame interface 3 is achieved, which has a particularly advantageous effect with regard to a position of the drive of the vehicle 100. Specifically, as shown in FIGS. 1 to 3, the second bracket 42 is located on the side of the drive assembly 1 facing the chainring. The chainring 106 is connected in a rotationally fixed manner to an output shaft 107, which can be driven by the drive unit 2. Directly mechanically connecting the drive unit 2 and the frame interface 3 to the second wall 32, i.e., on the chainring side, ensures exact positioning of the chainring 106 relative to the frame interface 3, and thus precise positioning of the chainline. Moreover, a more direct mechanical force transmission between the chainring 106 and the frame interface 3 is enabled.

Preferably, the drive assembly (not shown) may comprise several first brackets 41 and several second brackets 42 having identical damping sleeves 5a and 5b, respectively.

Figure 4:
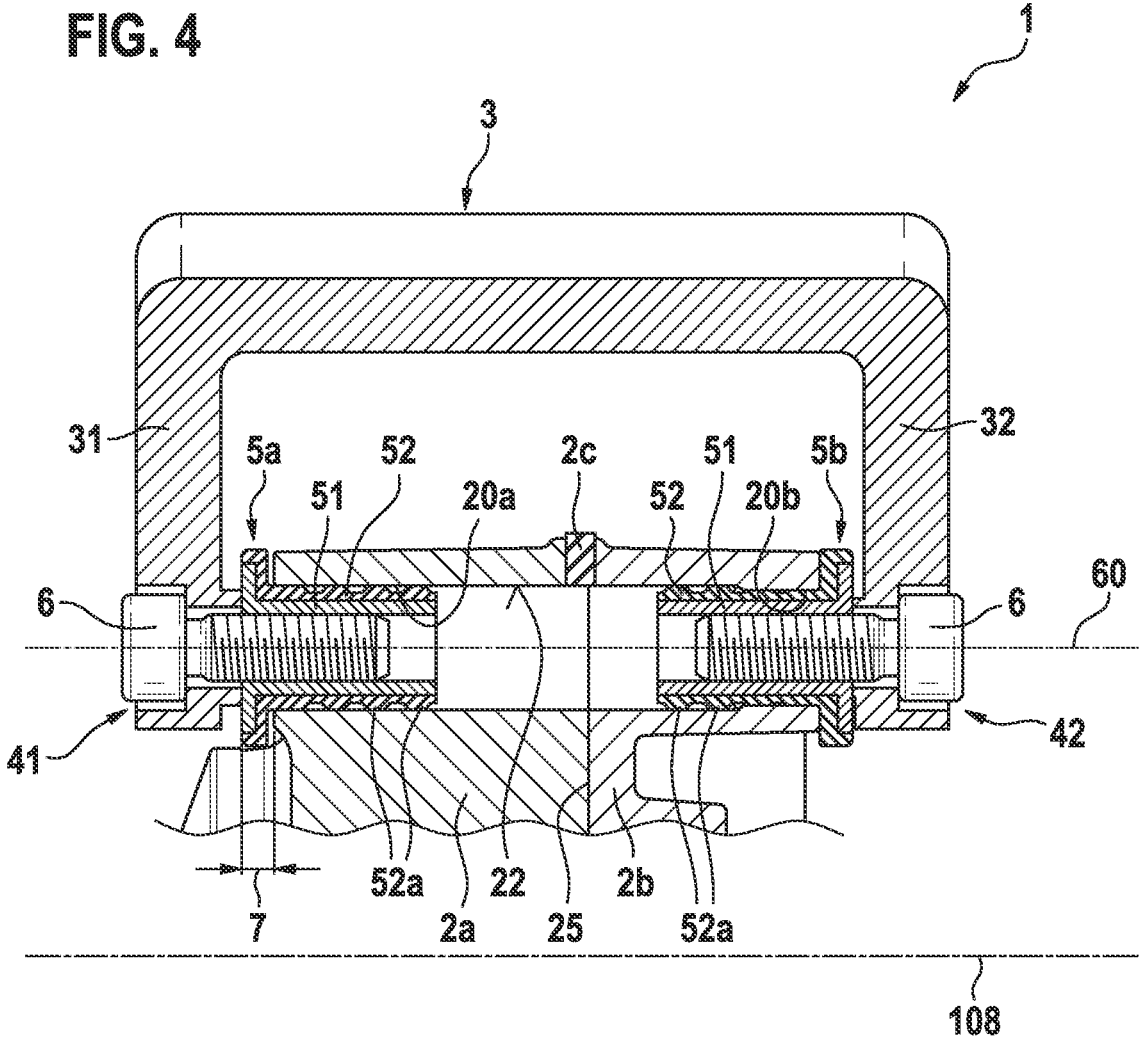
FIG. 4 shows a sectional view of a drive assembly according to a second exemplary embodiment of the present invention.
Figure 5:
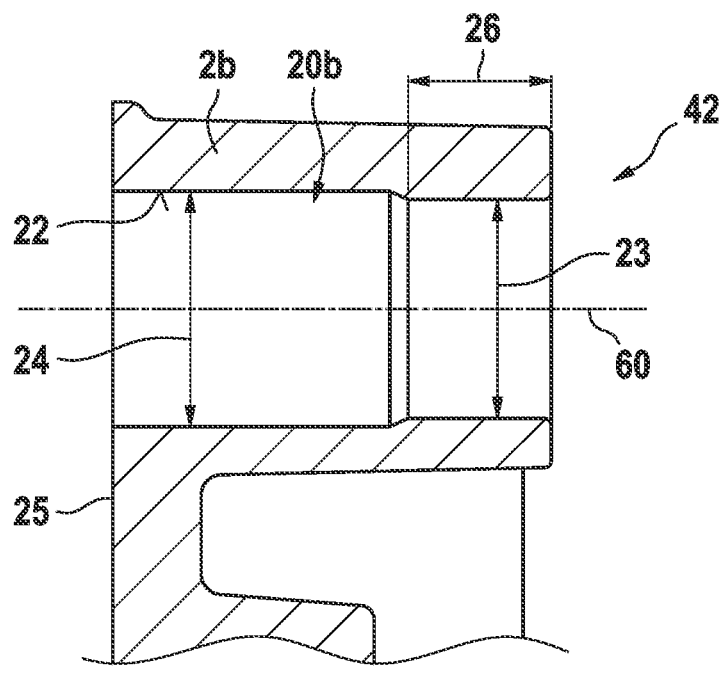
FIG. 5 shows a detail of FIG. 4.

FIG. 4 shows a detailed sectional view of a drive assembly 1 according to a second exemplary embodiment of the present invention. FIG. 5 shows a detail of FIG. 4. The second exemplary embodiment substantially corresponds to the first exemplary embodiment of FIG. 1, with the difference that the openings 20a, 20b of the drive unit 2 are not formed on protruding tabs 21 but are part of a through-opening 22 through the drive unit 2. In the second exemplary embodiment of FIG. 4, the drive unit 2 also comprises a two-part housing having a base region 2a and a lid 2b. A separation plane 25 between the base region 2a and the lid 2b is orthogonal to the bottom bracket axis 108. The lid 2b is arranged on the side of the chainring, i.e., on the second wall 32. For sealing against liquid ingress, an additional seal 2c may be provided between the two housing parts.

The first opening 20a and the second opening 20b, into which the damping sleeves 5a, 5b are pressed, are each formed in the second exemplary embodiment by a face or axial end of the through-opening 22. At the second opening 20b, the through-opening 22 comprises a tapering region 26, which has a smaller inner diameter 23 than the rest of the through-opening 22. In particular, the inner diameter 23 at the tapering region 26 is at most 98%, preferably at most 95% of the inner diameter 24 of the remaining through-opening (cf. FIG. 5).

The tapering region 26 is arranged directly adjacent to a face end of the through-opening 22 and extends over an axial length, which is less, preferably at least 10% less than an axial length of the second damping sleeve 5b.

The tapering region 26 thus on the one hand causes the second damping sleeve 5b to have the stronger press fit compared to the first damping sleeve 5a. Moreover, the lower axial length of the tapering region 26 has the effect that in the pressed-in state of the second damping sleeve 5b, the part, projecting beyond the tapering region 26, i.e., located further inward in the through-opening 22, of the damping element 52 can radially widen compared to the part of the damping element 52 within the tapering region 26 (cf. FIG. 6). This additionally produces an axial form fit between the damping element 5b and the second opening 20b, whereby the second damping element 5b is particularly reliably held in the second opening 20b.

Figure 6:
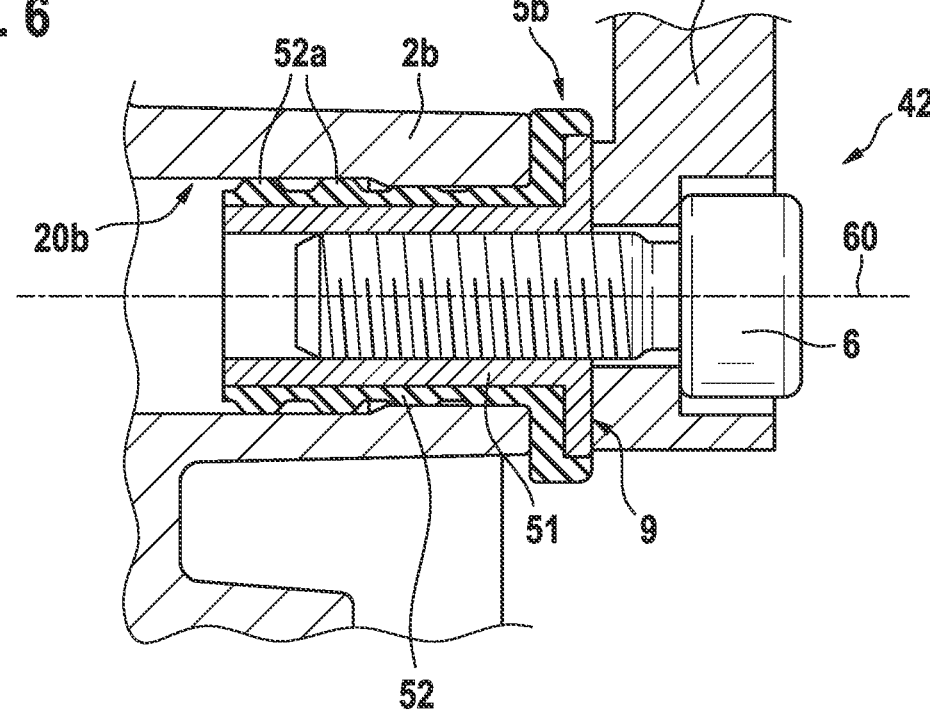
FIG. 6 shows a further detail of FIG. 4.

As can be seen in FIG. 4 and FIG. 6, the damping elements 52 in the second exemplary embodiment are also designed such that they each have several elevations 52a on the outer circumference. The elevations 52a have a trapezoidal cross-section. By means of the elevations 52a, on the one hand, the pressing-in of the damping sleeves 5a, 5b is facilitated, and on the other hand, the form fit at the second opening 20b with the tapering region 26 is more pronounced.

Figure 7:
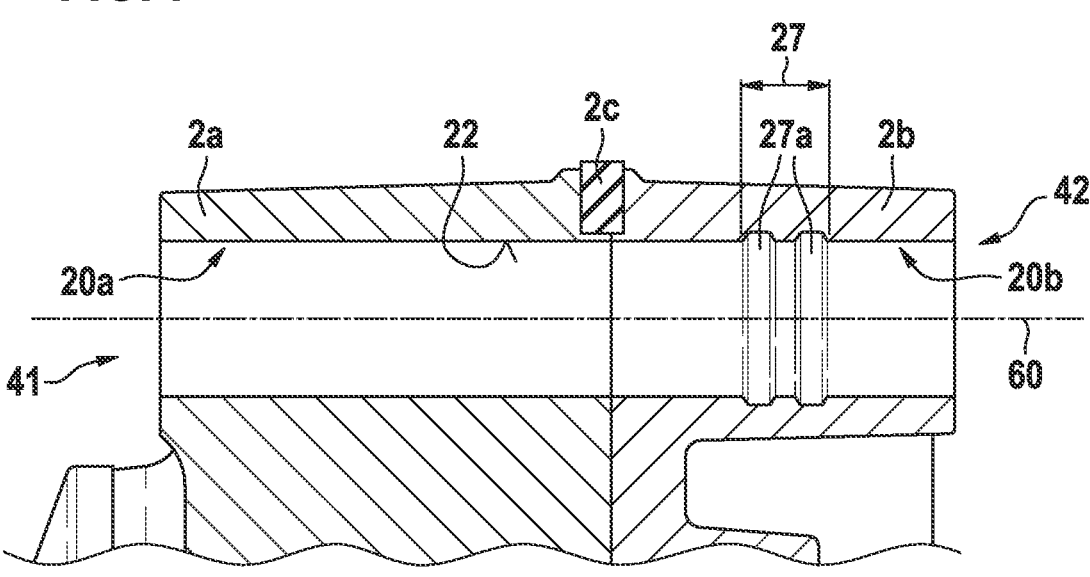
FIG. 7 show a detailed sectional view of a drive assembly according to a third exemplary embodiment of the present invention.
Figure 8:
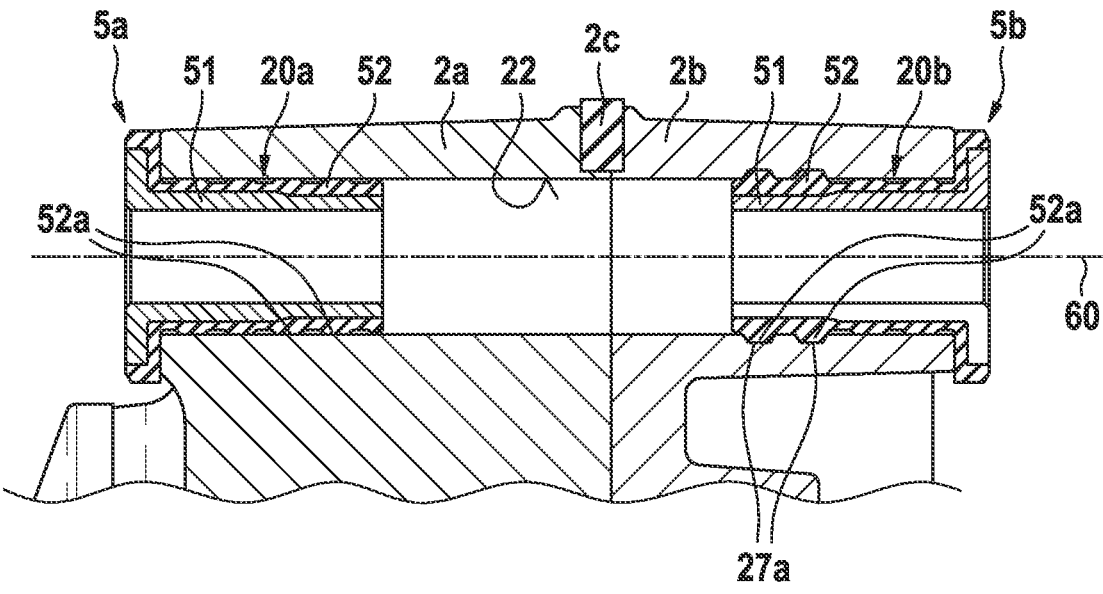
FIG. 8 shows a further detailed sectional view of the drive assembly of FIG. 7.

FIG. 7 shows a detailed sectional view of a drive assembly 1 according to a third exemplary embodiment of the present invention. In FIG. 7, only the drive unit 2 is shown. In FIG. 8, the drive assembly 1 of FIG. 7 is shown with pressed-in damping sleeves 5a, 5b. The third exemplary embodiment substantially corresponds to the second exemplary embodiment of FIGS. 4 to 6, with the difference that at the second opening 20b, circumferentially extending grooves 27a, instead of a tapering region 26, are formed on the inner circumference of the through-opening 22. The grooves 27a preferably have a geometry corresponding to the elevations 52a of the damping element 52, i.e., preferably a trapezoidal cross-section. As a result, an axial form fit between the damping element 52 and the drive unit 2 is also produced at the second damping element 5b in the pressed-in state by elastic radial widening of the elevations 52a located in the grooves 27a (cf. FIG. 8).

Figure 9:
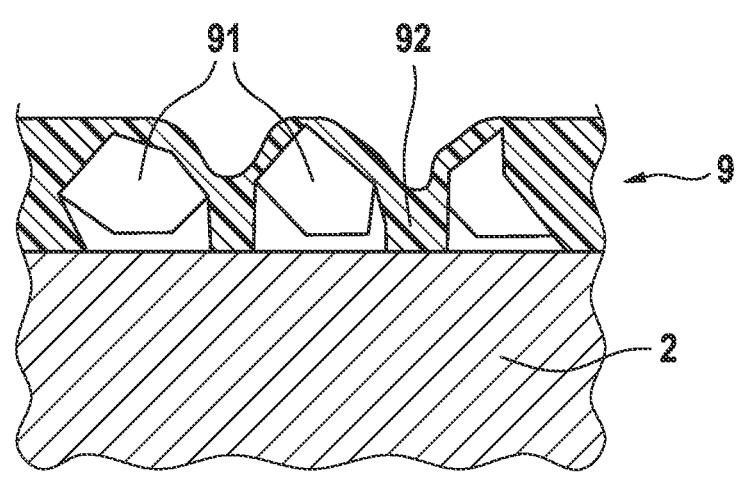
FIG. 9 shows a detailed sectional view of a drive assembly according to a fourth exemplary embodiment of the present invention in the unscrewed state.
Figure 10:
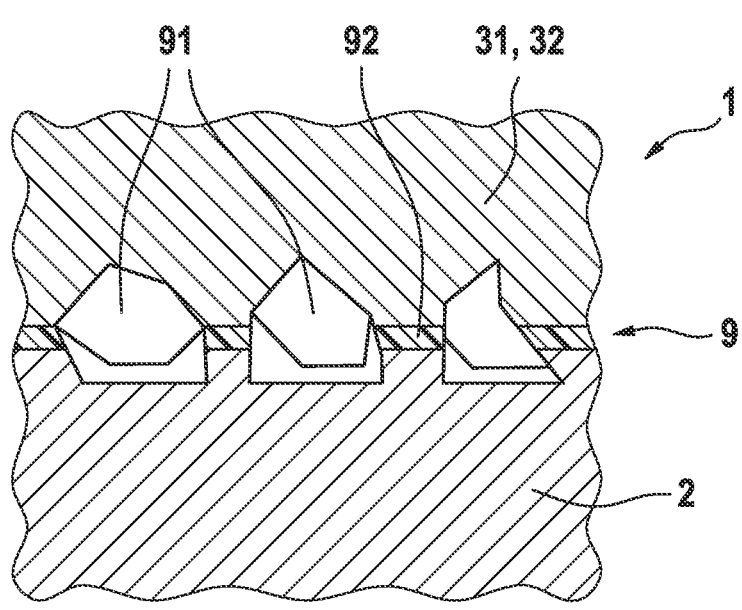
FIG. 10 shows a detailed sectional view of the drive assembly of FIG. 9 in the screwed state.

FIG. 9 shows a detailed sectional view of a drive assembly 1 according to a third exemplary embodiment of the present invention. In FIG. 9, only the drive unit 2 is shown. In FIG. 10, a detailed sectional view of the drive assembly 1 is shown in the screwed state of the drive unit 2 and frame interface 3. The third exemplary embodiment substantially corresponds to the first exemplary embodiment of FIGS. 1 to 3, with the difference that a friction coating 9 is additionally provided in a contact surface between the drive unit 2 and the frame interface 3. The friction coating 9 comprises several hard particles 91 which are coated with a nickel layer and which are in particular diamond particles.

As shown in FIG. 9, the hard particles 91 are first applied to a surface of the drive unit 2, wherein the hard particles adhere as a result of the nickel layer. The hard particles 91 are only applied to the contact surface, against which the frame interface 3 later abuts. Subsequently, the hard particles 91 as well as an entire outer side of the drive unit 2 are coated with a lacquer 92. As a result, the hard particles 91 better adhere to the drive unit 2 and corrosion protection is provided. The drive unit 2 and the frame interface 3 are subsequently screwed together. As a result, the contact surfaces of the drive unit 2 and the frame interface 3 are pressed against one another, whereby the hard particles 91 respectively dig into the surfaces of the two components. The lacquer 92 is compressed in said contact surface. The dug-in hard particles thus result in a micro form fit between the two components, whereby a particularly reliable and firm connection can be provided by an increased friction fit. An additional seal effect may be provided by the compressed lacquer 92.

As an alternative or in addition to the contact surface between the drive unit 2 and the frame interface 3, the friction coating 9 may also be provided at other contact regions, for example between the sleeve 51 and the frame interface 3 and/or the intermediate sleeve 51 and the drive unit 2, for example also as indicated in FIGS. 2 and 6.

FIG. 11 shows a detail of a drive assembly 1 according to a fifth exemplary embodiment of the present invention. The fifth exemplary embodiment substantially corresponds to the first exemplary embodiment of FIGS. 1 to 3, with the difference of an alternative damping sleeve 5a, 5b. Specifically, in the fifth exemplary embodiment, the sleeve 51 of the damping sleeve 5a, 5b is designed differently. This sleeve 51 is shown in a perspective view in FIG. 11.

The sleeve 51 comprises a shank 51b and a flange 51a. The shank 51b is inserted into the corresponding opening 20a, 20b of the drive unit 2. The flange 51a is provided for abutment against an inner side of the respective wall 31, 32 (cf., e.g., FIG. 2). The flange 51a of the sleeve 51 has a plurality of protruding form fit elements 51c on the side assigned to the wall 31, 32. Preferably, the form fit elements 51c are arranged in one or more circles that are concentric with the through-opening of the sleeve 51, preferably in two circles as in FIG. 11.

Figure 12:
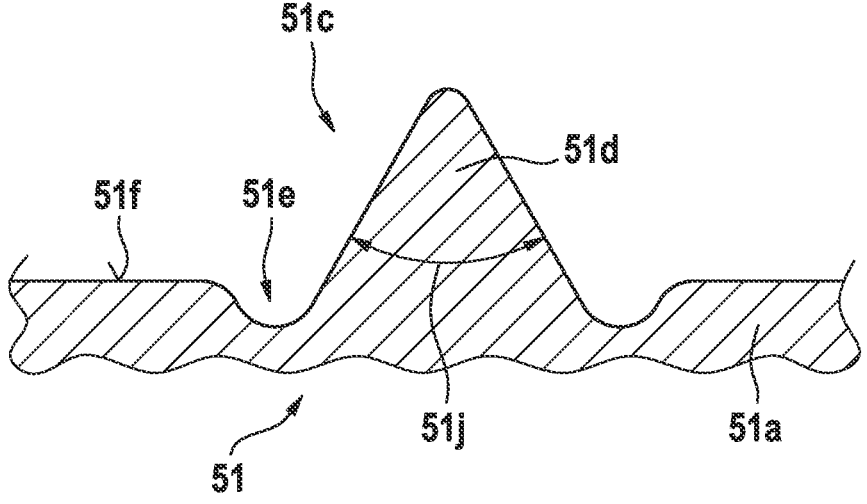
FIG. 12 shows a detailed sectional view of FIG. 11.

A single form fit element 51c of the sleeve of FIG. 11 is shown in a detailed sectional view in FIG. 12. Each form fit element 51c has a pyramid 51d protruding from a surface 51f of the flange 51a. Alternatively, each form fit element 51c may also preferably have a protruding cone. The pyramid 51d is formed as a straight pyramid and has an opening angle 51j of preferably less than 60°.

In this case, the pyramids 51d have the effect that they are pressed into the surface of the wall 31, 32, i.e., plastically deform the wall 31, 32, when the sleeve 51, i.e., the damping sleeve 5a, 5b, is screwed to the wall 31, 32. This produces a micro form fit between the sleeve 51 and the wall 31, 32 in a plane perpendicular to the screw axis, which enables a particularly fixed connection of the drive unit 2 and the frame interface 3 to one another, which can reliably prevent slippage.

In addition to the pyramid 51d, each form fit element 51c comprises a respective recess 51e, which is formed on an outer circumference of the pyramid 51d and in the surface 51f of the flange 51a. The recess 51e can, for example, receive material of the wall 31, 32 displaced by the penetration of the pyramid 51d into the wall 31, 32, so that the wall 31, 32 and the flange 51a can reliably rest precisely flatly on one another. For example, a respective recess 51e partially or completely surrounding the pyramid 51d may be provided per pyramid 51d. Alternatively, a single recess 51e can preferably be formed in the surface 51f of the flange 51a, the pyramids 51d being arranged on the radial inner side and/or outer side of said recess.

Figure 13:
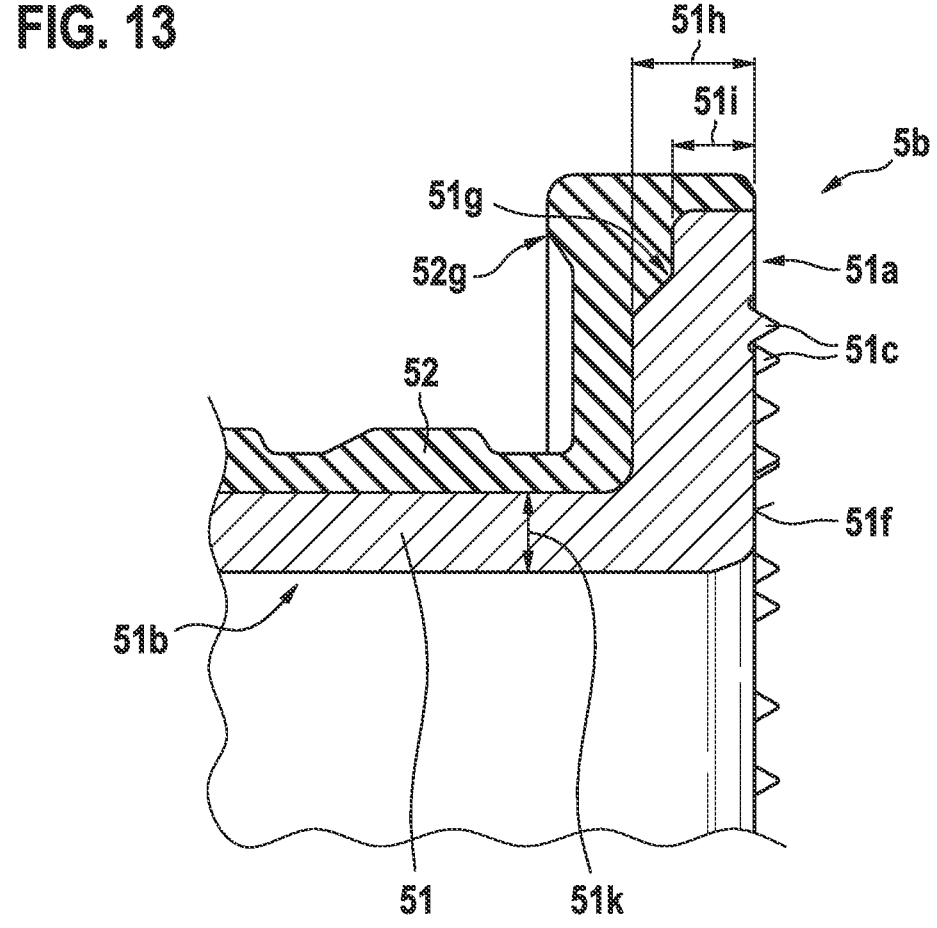
FIG. 13 shows a detailed sectional view of a drive assembly according to a sixth exemplary embodiment of the present invention.

FIG. 13 shows a detailed sectional view of a drive assembly 1 according to a sixth exemplary embodiment of the present invention. In FIG. 13, only one of the damping sleeves 5b is shown, namely the damping sleeve 5b on the second bracket 42. Preferably, the first damping sleeve 5a on the first bracket 41 is designed identically. The sixth exemplary embodiment substantially corresponds to the fifth exemplary embodiment of FIGS. 11 and 12, with the difference of an alternative design of the damping sleeve 5b in the region of the flange 51a. At a radially outer end of the flange 51a, the sleeve 51 has a taper 51g on the side of the flange 51a facing the shank 51b. The taper 51g is designed in such a way that a maximum thickness 51i of the flange 51a at the taper 51g corresponds to at most 70% of a thickness 51h of the remaining flange 51a. In this respect, the thicknesses along a direction parallel to a longitudinal axis of the damping sleeve 5b are considered.

The damping element 52 is designed to compensate for the taper 51g of the flange 51a. Additionally, at a radially outermost end, the damping element 52 comprises a thickening 52g. As a result, a particularly thick damping element 52 is present at the radially outer end of the flange 51a. This has an advantageous effect on an optimal seal between the damping sleeve 5b and the drive unit 2.

Figure 14:
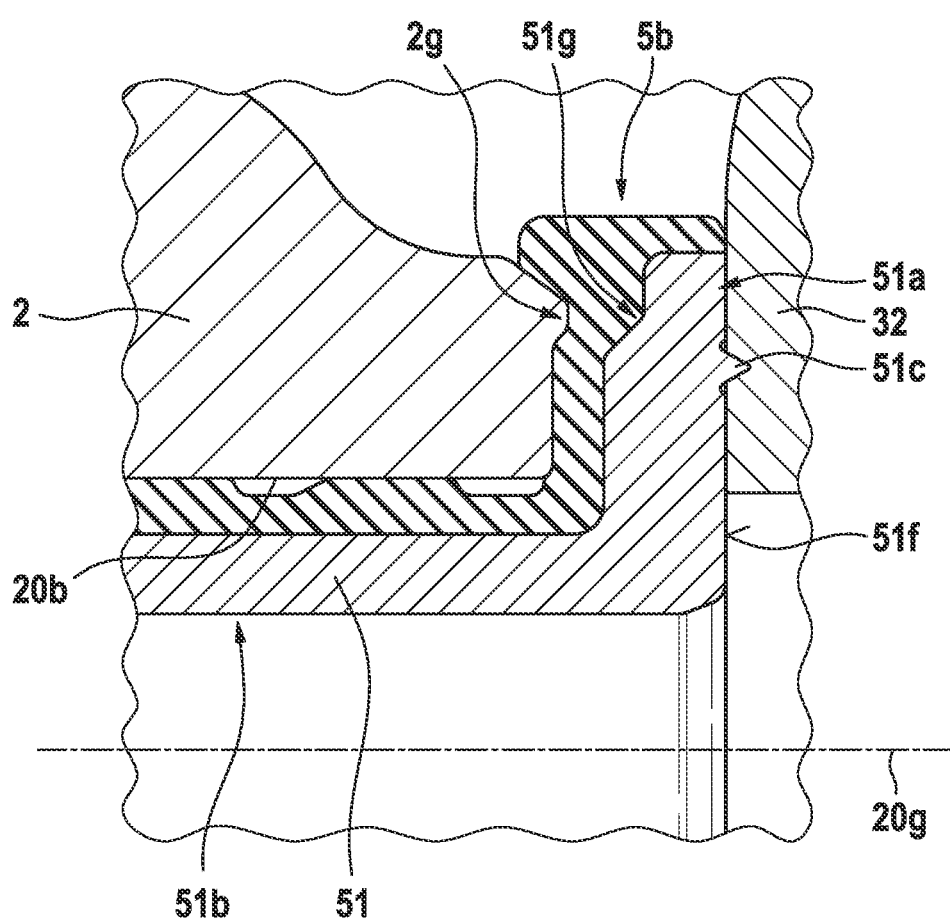
FIG. 14 shows a further detailed sectional view of the drive assembly of FIG. 13.

This seal is furthermore supported by a protruding annular rib 2g of the drive unit 2, which is provided in the sixth exemplary embodiment as shown in FIG. 14. The protruding annular rib 2g has a trapezoidal cross-section and is arranged concentrically with the opening 20b of the drive unit 2. In the pressed-in state of the damping sleeve 5b into the opening 20b, the protruding annular rib 2g and the tapering 51g of the sleeve 51 are located on the same radius with respect to the opening axis 20g of the opening 20b. As a result, the protruding annular rib 2g dips into the soft zone of the damping element 52 in the region of the taper 51g when the damping sleeve 5b and the drive unit 2 are pressed against one another in the fully screwed state. As a result of the elasticity of the damping element 52, an optimal seal can thus be provided at the drive unit 2.

Figure 15:
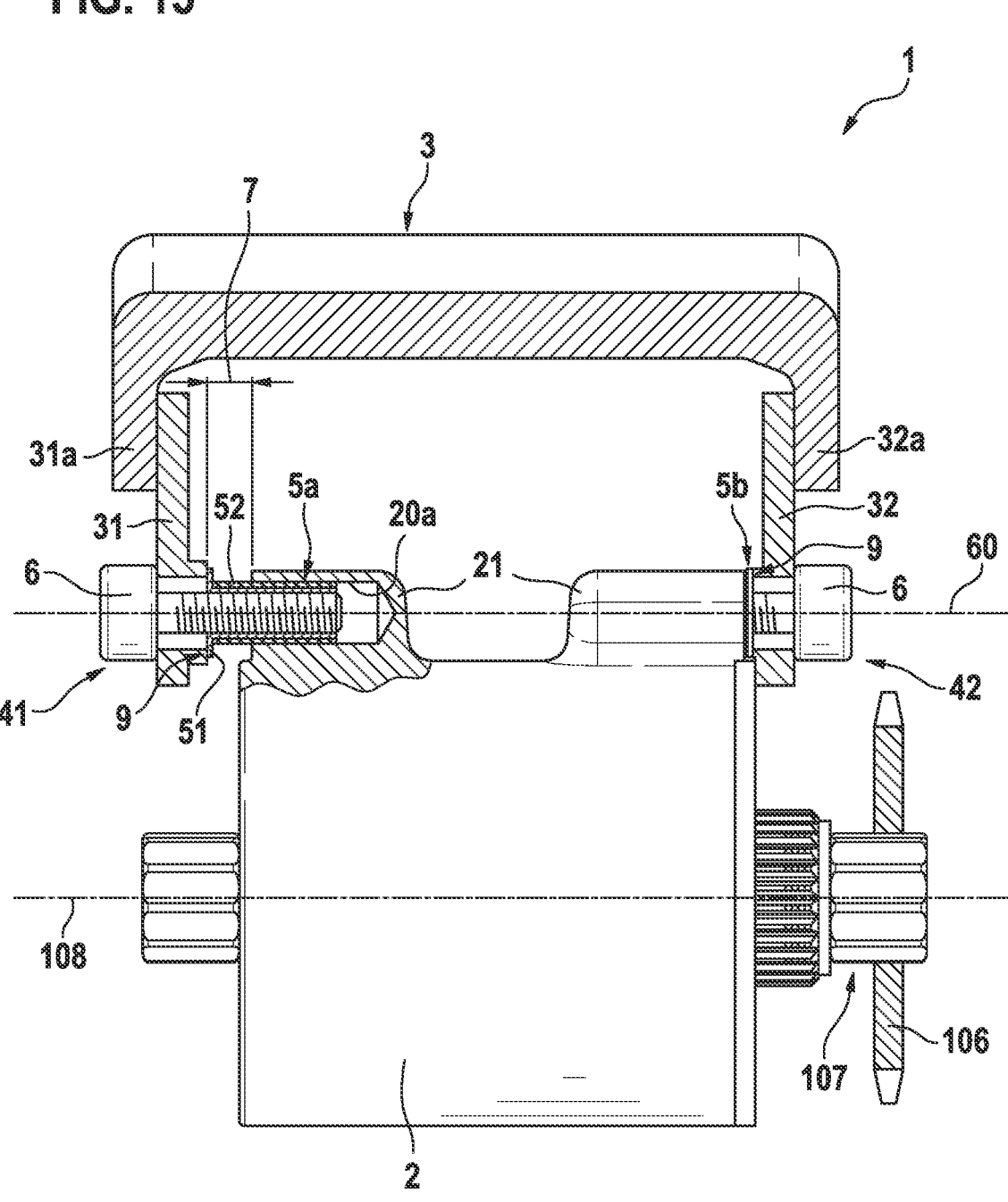
FIG. 15 shows a sectional view of a drive assembly according to a seventh exemplary embodiment of the present invention.

FIG. 15 shows a sectional view of a drive assembly 1 according to a seventh exemplary embodiment of the present invention. The seventh exemplary embodiment substantially corresponds to the first exemplary embodiment of FIGS. 1 to 3, with the difference that the drive unit 2 is indirectly screwed to the frame interface 3. Specifically, the two walls 31, 32 to which the drive unit 2 is screwed are designed as separate components from the frame interface 3. The walls 31, 32 may be designed as retaining plates, for example. In this case, the walls 31, 32 can be connected to frame walls 31a, 32a of the frame interface 3 by means of additional screw connections and/or weld connections (not shown). As a result, a particularly high flexibility of the drive assembly 1 can be provided.

Figure 16:
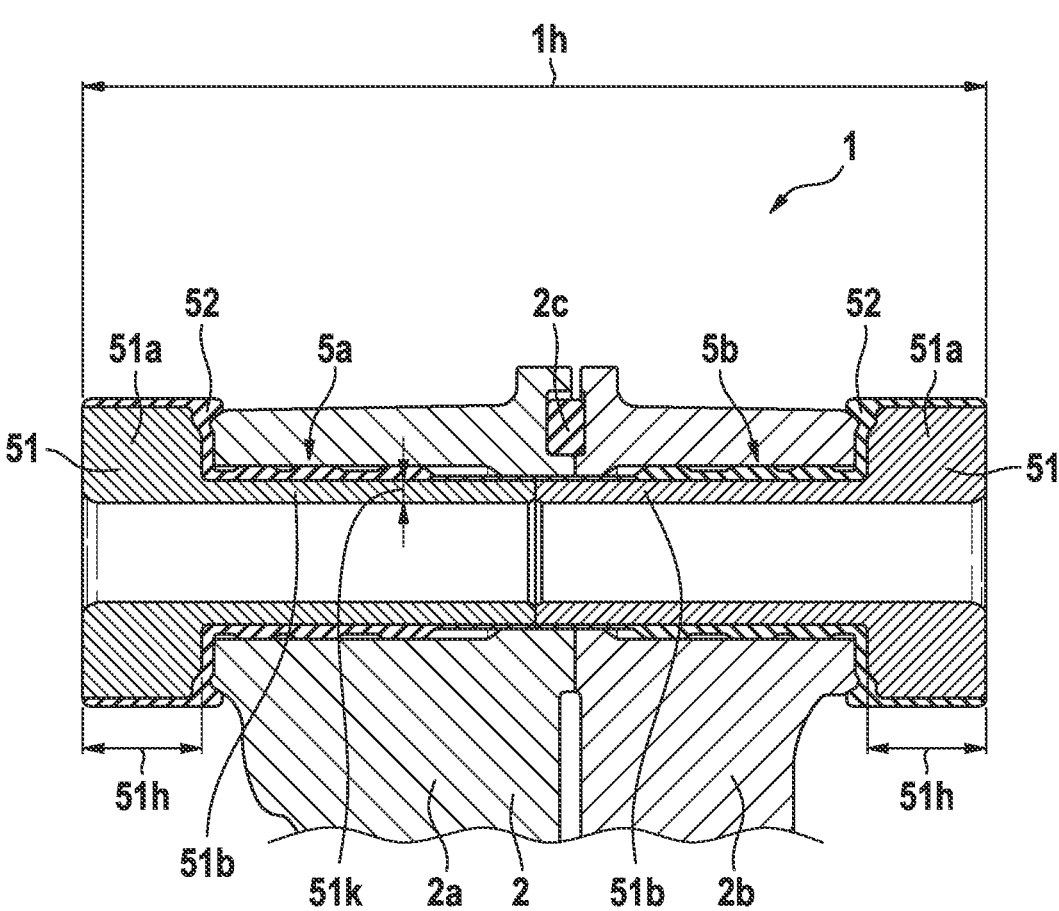
FIG. 16 shows a sectional view of a drive assembly according to an eighth exemplary embodiment of the present invention.

FIG. 16 shows a sectional view of a drive assembly 1 according to an eighth exemplary embodiment of the present invention. The eighth exemplary embodiment substantially corresponds to the sixth exemplary embodiment of FIGS. 13 and 14, with the difference that alternative damping sleeves 51 are used. Specifically, the flanges 51a of the sleeves 51 are thicker in the eighth exemplary embodiment of FIG. 16 than in the sixth exemplary embodiment. Specifically, the thickness 51h of the flanges 51a in the eighth exemplary embodiment is a multiple of, preferably at least three times, a wall thickness 51k of the corresponding shank 51b of the respective sleeve 51. As a result, an overall width 1h of the drive assembly 1 can be larger compared to the sixth exemplary embodiment, in which the thickness 51h of the flange 51a is approximately equal to the wall thickness 51k of the shank 51b, for example. The eighth exemplary embodiment of FIG. 16 thus illustrates that through changes in the sleeves 51, it is possible to adapt the drive assembly 1 to various vehicles 100 in a particularly simple and cost-effective manner.

Figure 17:
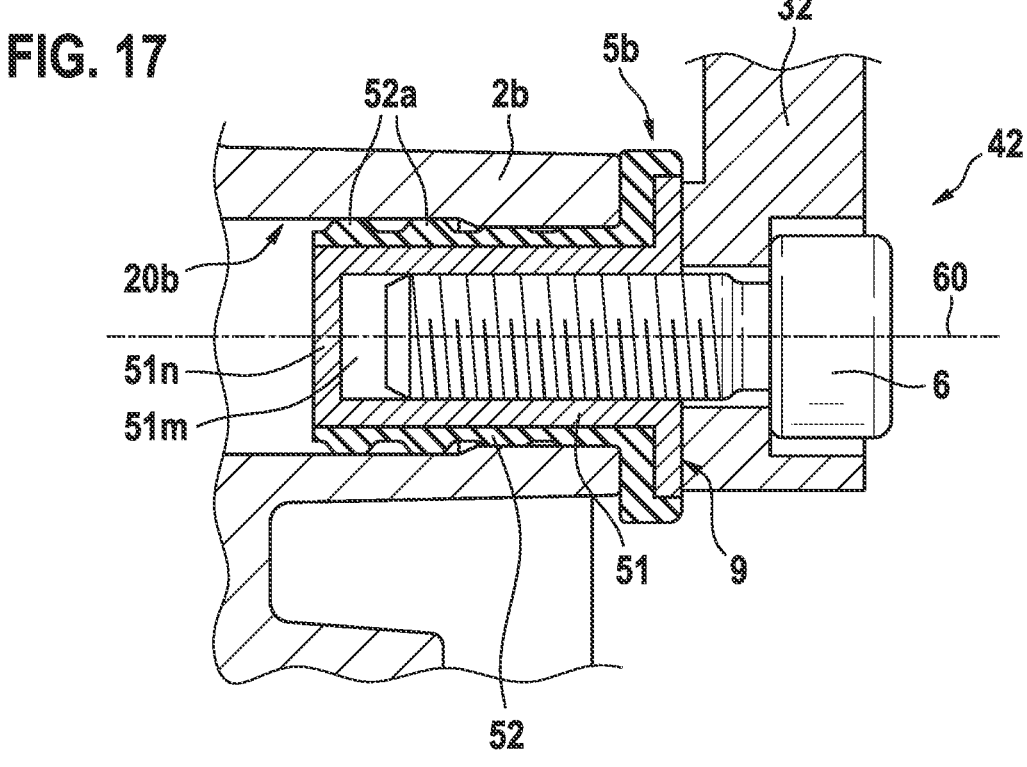
FIG. 17 shows a detail of a sectional view of a drive assembly according to a ninth exemplary embodiment of the present invention.

FIG. 17 shows a detail of a sectional view of a drive assembly 1 according to a ninth exemplary embodiment of the present invention. The ninth exemplary embodiment substantially corresponds to the second exemplary embodiment of FIGS. 4 to 6, with the difference that alternative damping sleeves 5a, 5b are used. By way of example, only the second damping sleeve 5b is shown in FIG. 17, wherein the first damping sleeve 5a is preferably identical. In the ninth exemplary embodiment of FIG. 17, the sleeve 51 of the damping sleeve 5b is designed as a sleeve closed on one side and having a blind bore 51m. That is to say, a face end of the sleeve 51 pointing into the interior of the drive unit 2 is closed by means of a bottom 51n so that the blind bore 51m is fluidly sealed with respect to the opening 20b. This can reliably prevent galvanic corrosion between the housing and the screw 6, formed, for example, from steel, in particular if magnesium is used as the housing material for the drive unit 2.

Particularly advantageously, a development (not shown) of the damping sleeve 5b, shown by way of example in FIG. 17, in which the damping element 52 additionally extends across the face, i.e., is arranged on the side of the bottom 51n facing away from the blind bore 51m.

A further preferred development (not shown) of the damping sleeve 5b, shown by way of example in FIG. 17, has an alternative closure of the through-hole by the sleeve 51. In this case, the face end is closed by the damping element 52 rather than by the bottom 51n. This can achieve the same advantageous effect of reliable sealing to prevent galvanic corrosion.

What is claimed is:

1. A drive assembly of a vehicle operable with muscular power and/or motor power, comprising:
   a drive unit;
   a frame interface, wherein the drive unit is arranged at least partially between a first wall and a second wall of the frame interface;
   a first bracket holding the drive unit on the first wall; and
   a second bracket holding the drive unit on the second wall;
   wherein the first bracket includes a first damping sleeve inserted into a first opening of the drive unit,
   wherein the second bracket includes a second damping sleeve inserted into a second opening of the drive unit;
   wherein the first damping sleeve and the second damping sleeve are screwed to the first and second wall, respectively, by a screw, and
   wherein each for the first damping sleeve and the second damping sleeve includes a sleeve, and a damping element at least partially surrounding the sleeve and formed from a vibration-damping material,
   wherein at least one of:
      the first and second openings are configured in such a way that a press fit between the first damping sleeve and the first opening has a smaller interference than a press fit between the second damping sleeve and the second opening;
      the second opening includes a groove region including at least one circumferentially extending groove on an inner circumference of the second opening;
      the drive unit includes a through-opening, and face ends of the through-opening form the first and second openings into which the first and second damping sleeves, are respectively inserted, wherein the through-opening at the second opening includes a tapering region having a smaller inner diameter than the rest of the through-opening;
      each damping element includes several circumferentially extending elevations on an outer circumference; or
      the drive assembly further includes a friction coating arranged on a surface of the drive unit and/or on a surface of the frame interface and/or on a surface of the first damping sleeve and/or on a surface of the second damping sleeve, wherein the friction coating includes hard particles to increase friction.

2. The drive assembly according to claim 1, wherein each damping element is formed from an elastomer.

3. The drive assembly according to claim 1, wherein the first bracket is configured in such a way that in a screwed state, the first damping sleeve bridges a gap between the drive unit and the first wall.

4. The drive assembly according to claim 1, wherein the first and second openings are configured in such a way that a press fit between the first damping sleeve and the first opening has a smaller interference than a press fit between the second damping sleeve and the second opening.

5. The drive assembly according to claim 1, wherein the drive unit includes, for each respective opening of the first and second openings, one protruding mounting tab in which the respective opening is arranged.

6. The drive assembly according to claim 1, wherein the drive unit includes a through-opening, and face ends of the through-opening form the first and second openings into which the first and second damping sleeves, are respectively inserted.

7. The drive assembly according to claim 6, wherein the through-opening at the second opening includes a tapering region having a smaller inner diameter than the rest of the through-opening.

8. The drive assembly according to claim 7, wherein the drive unit includes a two-part housing having a base region and a lid, wherein the tapering region is arranged exclusively within the lid.

9. The drive assembly according to claim 1, wherein the second opening includes a groove region including at least one circumferentially extending groove on an inner circumference of the second opening.

10. The drive assembly according to claim 1, wherein each damping element includes several circumferentially extending elevations on an outer circumference.

11. The drive assembly according to claim 1, wherein at least one of the sleeves includes a shank and a flange, wherein the flange has a taper at a radially outer end and on a side facing the shank, and wherein the taper is compensated by the damping element.

12. The drive assembly according to claim 1, further comprising:
   a friction coating arranged on a surface of the drive unit and/or on a surface of the frame interface and/or on a surface of the first damping sleeve and/or on a surface of the second damping sleeve, wherein the friction coating includes hard particles to increase friction.

13. A drive assembly of a vehicle operable with muscular power and/or motor power, comprising:
   a drive unit;
   a frame interface, wherein the drive unit is arranged at least partially between a first wall and a second wall of the frame interface;
   a first bracket holding the drive unit on the first wall; and
   a second bracket holding the drive unit on the second wall;
   wherein the first bracket includes a first damping sleeve inserted into a first opening of the drive unit,
   wherein the second bracket includes a second damping sleeve inserted into a second opening of the drive unit;
   wherein the first damping sleeve and the second damping sleeve are screwed to the first and second wall, respectively, by a screw, and wherein each for the first damping sleeve and the second damping sleeve includes a sleeve, and a damping element at least partially surrounding the sleeve and formed from a vibration-damping material, wherein at least one of:

the sleeves includes a shank and a flange on a side facing the first or second wall overarching the dampening element surrounding the shank in a radial outward direction; or the sleeves includes a shank and a flange on a side facing the first or second wall, the flange located between (i) the first or second wall and (ii) a housing of the drive unit.

14. The drive assembly according to claim 13, wherein each of the plurality of protruding form fit elements of the flange has a pyramid or a cone protruding from a surface of the flange.

15. The drive assembly according to claim 14, wherein each of the protruding form fit elements of the flange has a recess in the surface of the flange adjacent to the pyramid protrusion.

16. The drive assembly according to claim 11, wherein the drive unit includes at least one protruding annular rib arranged concentrically with one of the first or second openings, wherein the protruding annular rib and the taper of the flange of the one of the sleeves are arranged on a same radius with respect to an opening axis of the first or second opening.

17. The drive assembly according to claim 12, wherein the friction coating further includes a lacquer with which the hard particles are coated.

18. The drive assembly according to claim 13, wherein: (i) the flange of at least one of the sleeves has a thickness substantially corresponding to a wall thickness of the shank of the at least one of the sleeves, or (ii) the flange of at least one of the sleeves has a thickness corresponding to at least 1.5 times a wall thickness of the shank of the at least one of the sleeves.

19. A vehicle operable with muscular power and/or motor power, the vehicle being an electric bicycle, the vehicle comprising:

a drive assembly a drive unit, a frame interface, wherein the drive unit is arranged at least partially between a first wall and a second wall of the frame interface, a first bracket holding the drive unit on the first wall, and a second bracket holding the drive unit on the second wall, wherein the first bracket includes a first damping sleeve inserted into a first opening of the drive unit, wherein the second bracket includes a second damping sleeve inserted into a second opening of the drive unit;

wherein the first damping sleeve and the second damping sleeve are screwed to the first and second wall, respectively, by a screw, and wherein each for the first damping sleeve and the second damping sleeve includes a sleeve, and a damping element at least partially surrounding the sleeve and formed from a vibration-damping material, wherein at least one of:

the first and second openings are configured in such a way that a press fit between the first damping sleeve and the first opening has a smaller interference than a press fit between the second damping sleeve and the second opening;

the second opening includes a groove region including at least one circumferentially extending groove on an inner circumference of the second opening;

the drive unit includes a through-opening, and face ends of the through-opening form the first and second openings into which the first and second damping sleeves, are respectively inserted, wherein the through-opening at the second opening includes a tapering region having a smaller inner diameter than the rest of the through-opening;

each damping element includes several circumferentially extending elevations on an outer circumference; or the drive assembly further includes a friction coating arranged on a surface of the drive unit and/or on a surface of the frame interface and/or on a surface of the first damping sleeve and/or on a surface of the second damping sleeve, wherein the friction coating includes hard particles to increase friction.

20. The vehicle according to claim 19, further comprising: a vehicle frame, wherein: (i) the frame interface of the drive assembly is an integral part of the vehicle frame, or (ii) the frame interface and/or at least one of the first and second walls is a separate component from the vehicle frame and is connected to the vehicle frame by a screw.

21. The vehicle according to claim 19, further comprising: a chainring connected to an output shaft of the drive unit, and wherein the second bracket of the drive assembly is arranged on a side of the chainring.

* * * * *